(12) United States Patent
Carralero et al.

(10) Patent No.: US 11,126,065 B2
(45) Date of Patent: Sep. 21, 2021

(54) PHOTONIC CRYSTALS LOGIC DEVICES

(71) Applicant: THE BOEING COMPANY, Chicago, IL (US)

(72) Inventors: Michael A. Carralero, Chicago, IL (US); Ty A. Larsen, Chicago, IL (US); Joseph M. Tostenrude, Chicago, IL (US)

(73) Assignee: The Boeing Company, Chicago, IL (US)

( * ) Notice: Subject to any disclaimer, the term of this patent is extended or adjusted under 35 U.S.C. 154(b) by 443 days.

(21) Appl. No.: 15/178,464

(22) Filed: Jun. 9, 2016

(65) Prior Publication Data

US 2017/0357143 A1   Dec. 14, 2017

(51) Int. Cl.
*H03K 17/78* (2006.01)
*G02F 3/00* (2006.01)

(52) U.S. Cl.
CPC ............ *G02F 3/00* (2013.01); *G02F 2201/34* (2013.01); *G02F 2202/32* (2013.01)

(58) Field of Classification Search
CPC .......... G02F 3/00; G02F 1/0126; G02B 6/42; B82Y 20/00
USPC .................................................. 250/214 DC
See application file for complete search history.

(56) References Cited

U.S. PATENT DOCUMENTS

| | | |
|---|---|---|
| 5,264,849 A | 11/1993 | Kondoh et al. |
| 5,862,286 A | 1/1999 | Imanishi et al. |
| 7,376,293 B2 * | 5/2008 | Murphy ............... H04B 10/077 385/12 |
| 7,480,319 B2 * | 1/2009 | Scherer .................. B82Y 20/00 359/108 |
| 7,826,058 B1 * | 11/2010 | Ullrich ................. G02B 6/3512 356/445 |

(Continued)

FOREIGN PATENT DOCUMENTS

| | | | |
|---|---|---|---|
| EP | 2725333 A2 * | 4/2014 | ............ G01L 1/247 |
| JP | S62-183172 | 11/1987 | |

(Continued)

OTHER PUBLICATIONS

Singh, et al., "All-Optical Logic Gates: Designs, Classification, and Comparison", Hindawi Publishing Corporation, Advances in Optical Technologies, vol. 2014, Article ID 275083, Mar. 19, 2014.

(Continued)

*Primary Examiner* — Georgia Y Epps
*Assistant Examiner* — Kevin Wyatt
(74) *Attorney, Agent, or Firm* — Haynes and Boone, LLP (57) ABSTRACT

Systems, methods, and apparatus for photonic crystals logic devices are disclosed. In one or more embodiments, a disclosed method for an optical logic device comprises radiating, by at least one source, at least one signal. The method further comprises reflecting at least one signal off of at least one photonic crystal, when at least one photonic crystal senses a physical phenomena of a threshold strength. Also, the method comprises not reflecting at least one signal off of at least one photonic crystal, when at least one photonic crystal does not sense the physical phenomena of the threshold strength. Further, the method comprises detecting or not detecting, by at least one detector, at least one signal.

20 Claims, 7 Drawing Sheets

(56) References Cited

U.S. PATENT DOCUMENTS

| | | | |
|---|---|---|---|
| 7,925,131 B2* | 4/2011 | Bogoni | G02F 3/00 359/108 |
| 8,633,729 B1* | 1/2014 | Brown | B82Y 10/00 326/6 |
| 2004/0008934 A1* | 1/2004 | Takiguchi | B82Y 20/00 385/27 |
| 2005/0163419 A1* | 7/2005 | Scherer | G02F 1/0126 385/16 |
| 2006/0280396 A1* | 12/2006 | Wu | B82Y 20/00 385/16 |
| 2010/0027104 A1* | 2/2010 | Esener | G02F 3/02 359/336 |
| 2012/0155502 A1* | 6/2012 | Matsuo | H01S 5/105 372/45.01 |
| 2012/0325001 A1* | 12/2012 | Carralero | G01D 5/268 73/514.26 |
| 2013/0169445 A1 | 7/2013 | Carralero et al. | |
| 2013/0219479 A1 | 8/2013 | DeSoto et al. | |

FOREIGN PATENT DOCUMENTS

| | | |
|---|---|---|
| JP | H04-115240 A | 4/1992 |
| JP | H05-027290 | 2/1993 |
| JP | H06-242481 | 2/1994 |
| JP | H08-015738 | 1/1996 |
| JP | 2010-516124 | 5/2010 |
| JP | 2013-535697 | 9/2013 |
| JP | 2014-112082 | 6/2014 |
| WO | WO 2008/086448 A2 | 7/2008 |
| WO | WO 2012/024043 A1 | 2/2012 |

OTHER PUBLICATIONS

Bogoni, "Trend, Challenges and Applications of Photonic Digital Processing", Scuola Superiore Sant'Anna, Pisa, Consorzi Nazionale Interuniversitario per le Telecomunicazioni (CNIT), Santa Barbara, Feb. 1, 2010.

Sharifi et al., "A new design procedure for all-optical photonic crystal logic gates and functions based on threshold logic", Optics Communications, Mar. 16, 2016, pp. 231-238, vol. 370, Elsevier, Amsterdam, Netherlands.

Salmanpour et al., "Photonic crystal logic gates: an overview", Optical and Quantum Electronics, Dec. 25, 2014, pp. 2249-2275, vol. 47, Issue 7, SpringerLink, Heidelberg, Germany.

Glushko et al., "Photonic membranes and photonic crystal resonators for all-optical signal processing", SPIE Photonics Europe, Photonic Crystal Materials and Devices IX, 2010, pp. 77131D-1-77131D-9, Proceedings vol. 7713, SPIE, Bellingham, Washington.

Glushko, Eugene YA., "Logical gates on trapped modes in photonic crystals with nonlinear coating", Integrated Optoelectronic Devices 2008, Advanced Optical Concepts in Quantum Computing, Memory, and Communication, Jan. 2008, pp. 69030G-1-69030G-12, Proceedings vol. 6903, SPIE, Bellingham, Washington.

Shaik et al., "Improved design of all-optical photonic logic gates using T-shaped waveguide", Optical and Quantum Electronics, Dec. 19, 2015, pp. 1-15, vol. 48:33, SpringerLink, Heidelberg, Germany.

* cited by examiner

PHOTONIC CRYSTALS LOGIC DEVICES

FIELD

The present disclosure relates to photonic crystals. In particular, it relates to photonic crystals logic devices.

BACKGROUND

The demand for high bandwidth has increased to reach the speed limit of electronic devices. Existing optical signal processing systems utilize digital gates that provide logic. Digital gates are complicated and require cumbersome electro-optic conversion, which introduce time delays and attenuate the signals. Existing solutions also use Semiconductor Optical Amplifiers (SOAs) to boost the attenuated signals. SOAs are good components for simultaneous modulation and amplification for multiplexed optical signal transmission. However, the utilization of cascading SOAs increases the distortion due to cross-modulation of the different channels. SOAs have higher noise, lower gain, moderate polarization dependence, and high nonlinearity with fast transient time that can distort the signals. This nonlinearity presents the most significant problem for optical communication applications. As such, there is a need for an improved optical logic device design.

SUMMARY

The present disclosure relates to a method, system, and apparatus for photonic crystals logic devices. In one or more embodiments, a method for an optical logic device comprises radiating, by at least one source, at least one signal. The method further comprises reflecting at least one signal off of at least one photonic crystal, when at least one photonic crystal senses a physical phenomena of a threshold strength. Also, the method comprises not reflecting at least one signal off of at least one photonic crystal, when at least one photonic crystal does not sense the physical phenomena of the threshold strength. Further, the method comprises detecting or not detecting, by at least one detector, at least one signal.

In one or more embodiments, the method further comprises outputting, by at least one detector, at least one response indicating that at least one signal was detected or not detected. In at least one embodiment, the method further comprises inverting, by at least one inverter, at least one response.

In at least one embodiment, at least one detector is a light detector and/or a laser detector. In some embodiments, at least one signal is an electromagnetic signal. In one or more embodiments, at least one source is a light source and/or a laser source. In at least one embodiment, at least one photonic crystal is one dimensional (1D), two dimensional (2D), and/or three dimensional (3D). In some embodiments, the physical phenomena is pressure, temperature, voltage, or vibration.

In one or more embodiments, the method further comprises disabling at least one photonic crystal. In some embodiments, at least one source, at least one photonic crystal, and at least one detector are housed together within at least one integrated circuit (IC) chip.

In at least one embodiment, an optical logic device comprises at least one source to radiate at least one signal. In one or more embodiments, at least one signal is reflected off of at least one photonic crystal, when at least one photonic crystal senses a physical phenomena of a threshold strength. In some embodiments, at least one signal is not reflected off of at least one photonic crystal, when at least one photonic crystal does not sense the physical phenomena of the threshold strength. The device further comprises at least one detector to detect or not detect at least one signal.

In one or more embodiments, at least one detector is further to output at least one response indicating that at least one signal was detected or not detected. In at least one embodiment, the device further comprises at least one inverter to invert at least one response. In some embodiments, at least one photonic crystal is disabled.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

DESCRIPTION

The methods and apparatus disclosed herein provide an operative system for photonic crystals logic devices. The system of the present disclosure provides all-optical gates constructed of a non-linear medium comprising photonic crystal mirrors that provide high bandwidth with low power consumption. In particular, the photonic crystal mirrors can produce logic by being activated (i.e. reflecting a signal) when the photonic crystal mirrors sense a threshold strength of a physical phenomena (e.g., pressure, temperature, voltage, or vibration) and by not being activated (i.e. not reflecting a signal) when the photonic crystal mirrors do not sense a threshold strength of the physical phenomena.

As previously mentioned above, the demand for high bandwidth has increased to reach the speed limit of electronic devices. All-optical signal processing with all-optical logic gates that operate at a high bit rate can address this bandwidth need. To make all-optical systems, it is necessary that all components be optical elements. The system of present disclosure makes this possible by employing all-optical gates, which are the key elements to achieving all-optical functions.

The system of the present disclosure may employ wafer-scale integration for the all-optical gates to facilitate better performance by improving power efficiency and reliability, which are critical for optical communications applications. The use of photonic crystals makes the packaging and assembly of all-optical gates simpler and more robust, which are ideal characteristics for demanding aerospace environments.

The present disclosure utilizes the implementation of systems-on-a-chip to provide a compact and cost-effective way of improving performance with better efficiency, higher reliability, and robustness. It should be noted that a single chip design has minimal optical interfaces, which aerospace environments demand. This technology can be utilized in ground breaking advancements in digital beam forming, which may be used in space applications.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to optical signal processing systems, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
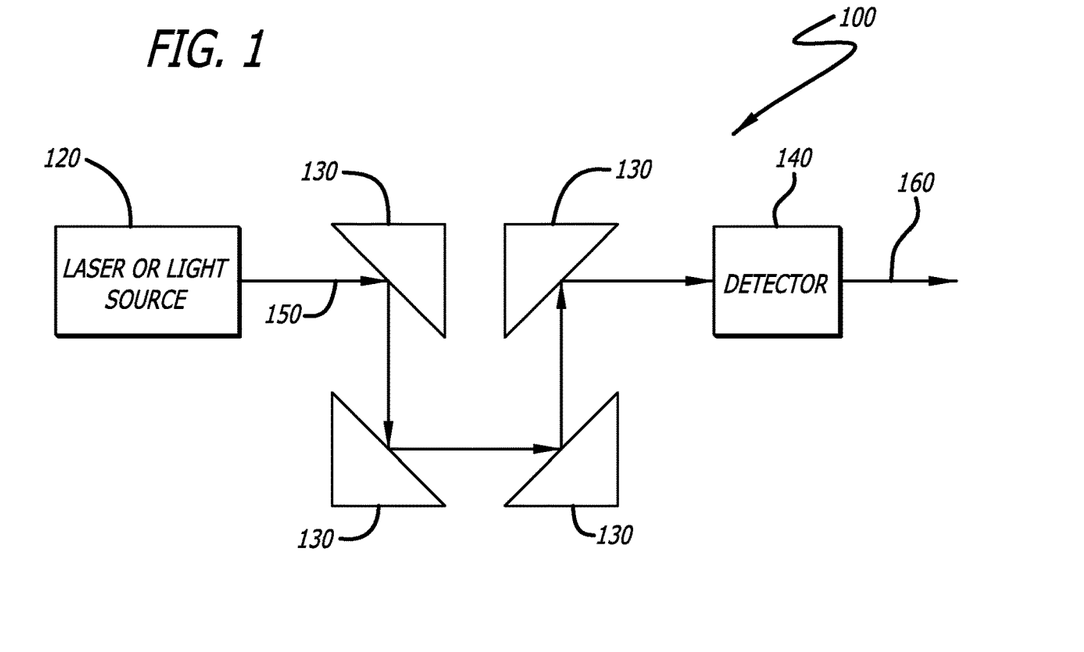
FIG. 1 is a diagram showing a disclosed photonic crystals logic device (i.e. an optical logic device), in accordance with at least one embodiment of the present disclosure.

FIG. 1 is a diagram showing a disclosed photonic crystals logic device (i.e. an optical logic device) 100, in accordance with at least one embodiment of the present disclosure. In this figure, the optical logic device 100 is shown to comprise a source 120, four photonic crystals 130, and a detector 140.

In one or more embodiments, the source 120 may be a light source or a laser source. In some embodiments, the optical logic device 100 may employ more than one source 120, as is shown in FIG. 1. In at least one embodiment, the photonic crystals 130 may be one dimensional (1D) photonic crystals, two dimensional (2D) photonic crystals, or three dimensional (3D) photonic crystals. In some embodiments, the optical logic device 100 may employ more than or less than four photonic crystals 130, as is shown in FIG. 1. In one or more embodiments, the detector 140 may be a light detector or a laser detector. In some embodiments, the optical logic device 100 may employ more than one detector 140, as is shown in FIG. 1.

During operation of the optical logic device 100, the source 120 radiates at least one signal 150 towards the photonic crystals 130. In one or more embodiments the signal 150 is an electromagnetic signal, such as an optical signal or light. If the photonic crystals 130 sense a threshold strength of a physical phenomena (e.g., pressure, temperature, voltage, or vibration) associated with each of the photonic crystals 130, the photonic crystals 130 are activated and, as such, will reflect the signal 150. However, if the photonic crystals 130 do not sense a threshold strength of the physical phenomena associated with each of the photonic crystals 130, the photonic crystals 130 are not activated and, as such, will not reflect the signal 150.

As shown in FIG. 1, all four photonic crystals 130 sense a threshold strength for their corresponding physical phenomena and are activated to reflect the signal 150. The signal 150 is then shown to be reflected towards the detector 140. The detector 140 then detects the signal 150 and outputs a response 160 indicating that the signal 150 was detected.

It should be noted that if one or more of the photonic crystals 130 do not sense a threshold strength for their corresponding physical phenomena, they will not be activated and will not reflect the signal 150. In these cases, the detector 140 will not detect the signal 150. The detector 140 will output a response 160 indicating that the signal 150 was not detected.

Figure 2:
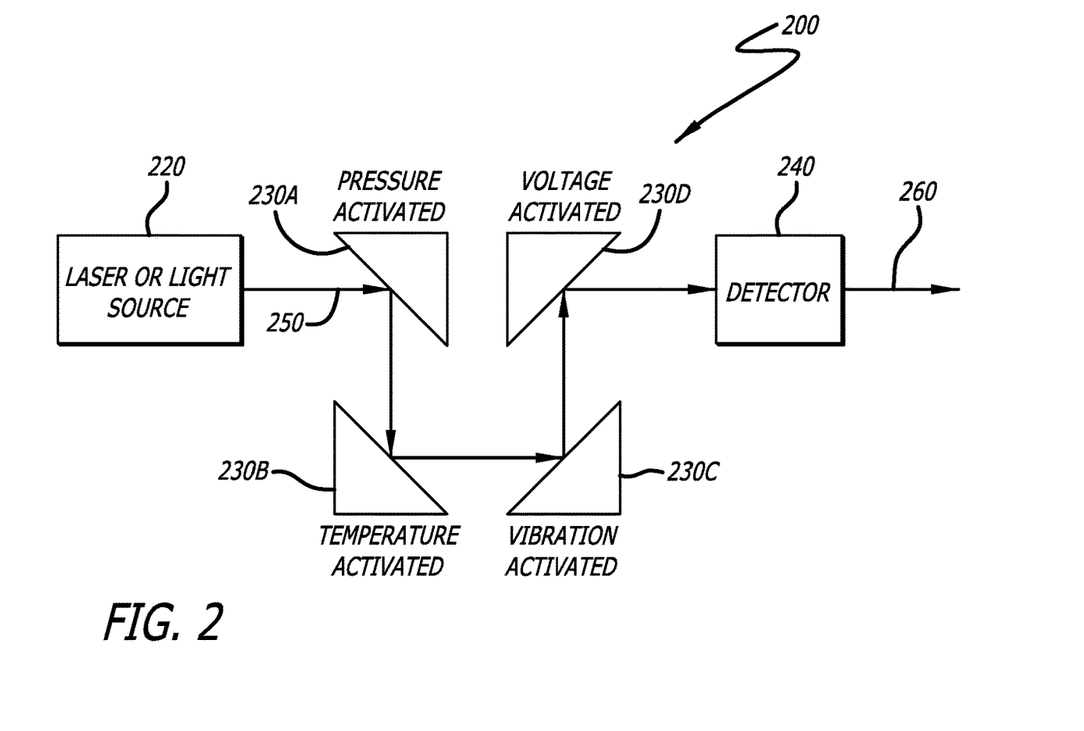
FIG. 2 is a diagram illustrating a disclosed photonic crystals logic device, where each of the photonic crystals senses a different physical phenomena, in accordance with at least one embodiment of the present disclosure.

FIG. 2 is a diagram illustrating a disclosed photonic crystals logic device (i.e. an optical logic device) 200, where each of the photonic crystals 230A, 230B, 230C, 230D senses a different physical phenomena, in accordance with at least one embodiment of the present disclosure. In this figure, the optical logic device 200 is shown to comprise a source 220, four photonic crystals 230A, 230B, 230C, 230D, and a detector 240. For this embodiment, each of the photonic crystals 230A, 230B, 230C, 230D is activated by a different physical phenomena. As shown in FIG. 2, photonic crystal 230A is activated by a threshold strength for pressure (e.g., a specific value of pounds per square inch (psi)), photonic crystal 230B is activated by a threshold strength for temperature (e.g., a specific value of degrees Kelvin (K)), photonic crystal 230C is activated by a threshold strength for vibration (e.g., a specific value of power spectral density (psd)), and photonic crystal 230D is activated by a threshold strength for voltage (e.g., a specific value of volts (V)).

During operation of the optical logic device 200, the source 220 radiates at least one signal 250 towards the photonic crystals 230A, 230B, 230C, 230D. If the photonic crystals 230 sense a threshold strength of a physical phenomena (e.g., pressure, temperature, voltage, or vibration) associated with each of the photonic crystals 230, the photonic crystals 230 are activated and, as such, will reflect the signal 250. However, if the photonic crystals 230 do not sense a threshold strength of the physical phenomena associated with each of the photonic crystals 230, the photonic crystals 230 are not activated and, as such, will not reflect the signal 250. For example, if photonic crystal 230A senses a threshold strength of pressure (e.g., a specific value of psi), the photonic crystal 230A will be activated and reflect the signal 250, as is shown in FIG. 2. Also, if photonic crystal 230B senses a threshold strength of temperature (e.g., a specific value of K), the photonic crystal 230B will be activated and reflect the signal 250, as is shown in FIG. 2. In addition, if photonic crystal 230C senses a threshold strength of vibration (e.g., a specific value of psd), the photonic crystal 230C will be activated and reflect the signal 250, as is shown in FIG. 2. Further, if photonic crystal 230D senses a threshold strength of voltage (e.g., a specific value of V), the photonic crystal 230D will be activated and reflect the signal 250, as is shown in FIG. 2.

As such, as is shown in FIG. 2, all four photonic crystals 230A, 230B, 230C, 230D sense a threshold strength for their corresponding physical phenomena and are activated to reflect the signal 250. The signal 250 is then shown to be reflected towards the detector 240. Then, the detector 240 detects the signal 250 and outputs a response 260 indicating that the signal 250 was detected.

It should be noted that if one or more of the photonic crystals 230A, 230B, 230C, 230D do not sense a threshold strength for their corresponding physical phenomena, they will not be activated and will not reflect the signal 250. In these cases, the detector 240 will not detect the signal 250. The detector 240 will output a response 260 indicating that the signal 250 was not detected.

Figure 3A:
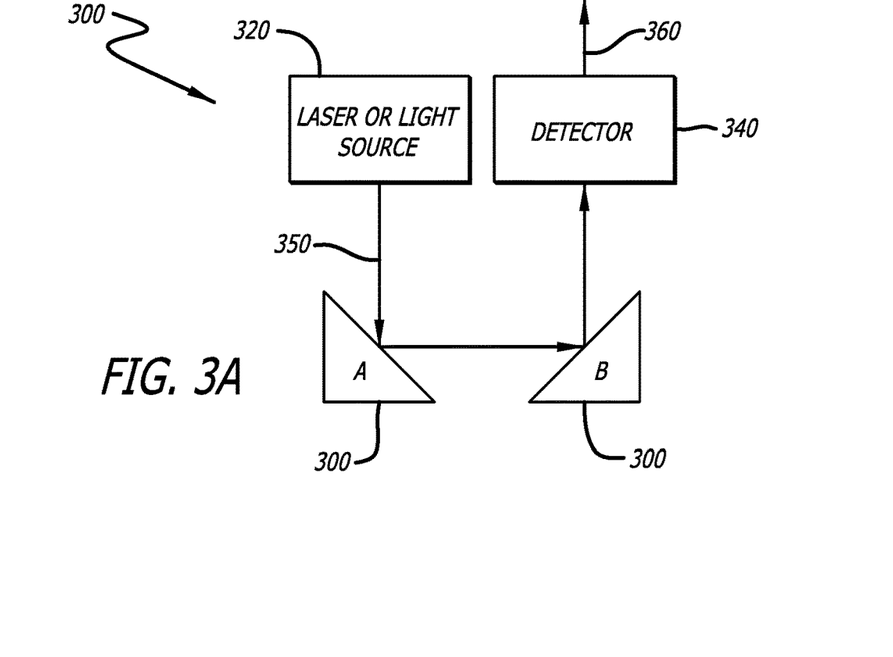
FIG. 3A is a diagram depicting a disclosed photonic crystals logic device having AND gate logic, in accordance with at least one embodiment of the present disclosure.

FIG. 3A is a diagram depicting a disclosed photonic crystals logic device (i.e. an optical logic device) 300 having AND gate logic, in accordance with at least one embodiment of the present disclosure. In this figure, the optical logic device 300 is shown to comprise a source 320, two photonic crystals 330A, 330B, and a detector 340.

During operation of the optical logic device 300, the source 320 radiates at least one signal 350 towards the photonic crystals 330A, 330B. If the photonic crystals 330A, 330B sense a threshold strength of a physical phenomena (e.g., pressure, temperature, voltage, or vibration) associated with each of the photonic crystals 330A, 330B, the photonic crystals 330A, 330B are activated and, as such, will reflect the signal 350. However, if the photonic crystals 330A, 330B do not sense a threshold strength of the physical phenomena associated with each of the photonic crystals 330A, 330B, the photonic crystals 330A, 330B are not activated and, as such, will not reflect the signal 350.

As shown in FIG. 3A, both photonic crystals 330A, 330B sense a threshold strength for their corresponding physical phenomena and are activated to reflect the signal 350. The signal 350 is then shown to be reflected towards the detector 340. The detector 340 then detects the signal 350 and outputs a response 360 indicating that the signal 350 was detected.

It should be noted that if one or both of the photonic crystals 330A, 330B do not sense a threshold strength for their corresponding physical phenomena, they will not be activated and will not reflect the signal 350. In these cases, the detector 340 will not detect the signal 350. The detector 340 will output a response 360 indicating that the signal 350 was not detected.

Figure 3B:
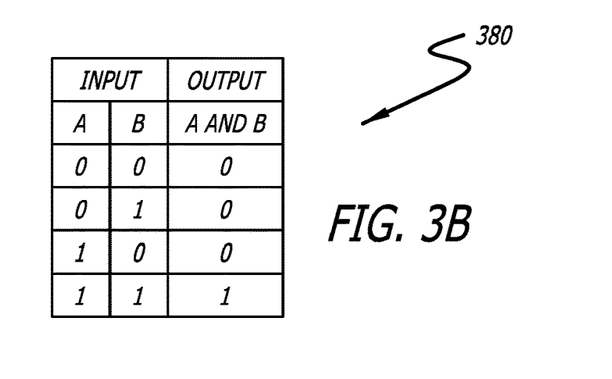
FIG. 3B is a table comprising AND gate logic, which corresponds to the logic of the photonic crystals logic device of FIG. 3A.

FIG. 3B is a table 380 comprising AND gate logic, which corresponds to the logic of the photonic crystals logic device of FIG. 3A. In table 380, the input columns contain a "1" when the corresponding photonic crystals 330A, 330B are activated and reflect the signal 350. And, the input columns contain a "0" when the corresponding photonic crystals 330A, 330B are not activated and do not reflect the signal 350. The output column values indicate the data contained in the response signal 360. In this case, the output column contains a "1" when the detector 340 detects the signal 350, and the output column contains a "0" when the detector 340 does not detect the signal 350.

Figure 3C:
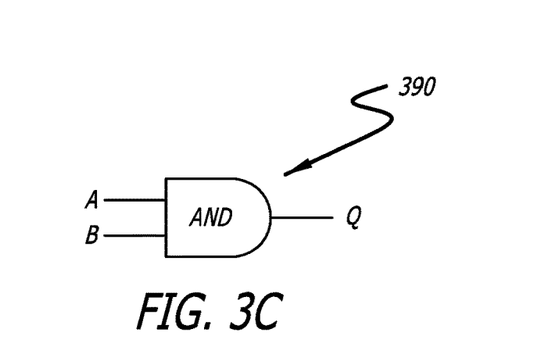
FIG. 3C is a conventional diagram of an AND gate.

FIG. 3C is a conventional diagram of an AND gate 390. In this figure, the AND gate 390 is shown to have a two inputs (A and B), and one output (Q).

Figure 4A:
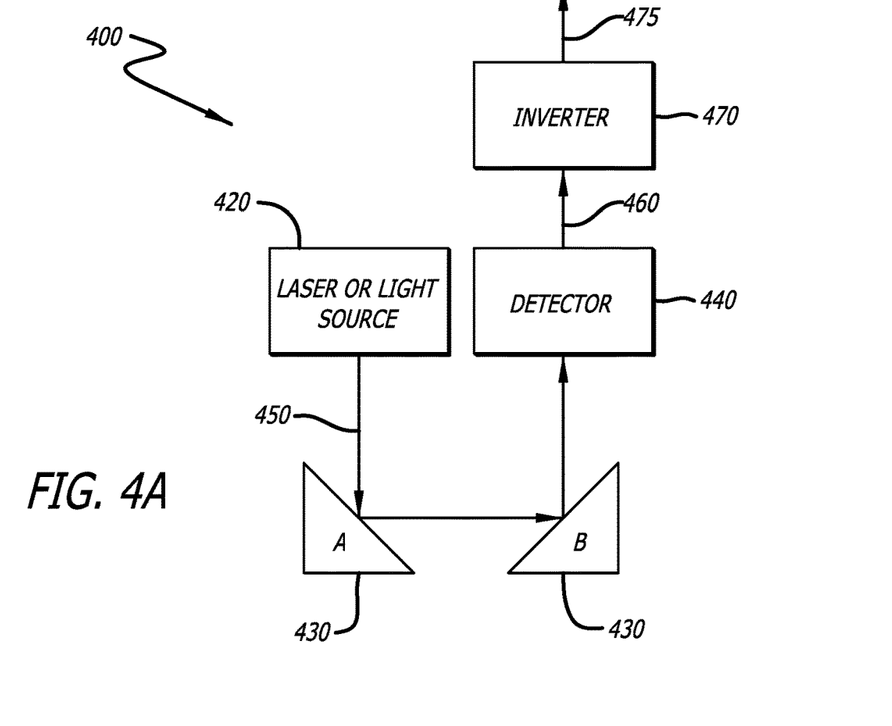
FIG. 4A is a diagram showing a disclosed photonic crystals logic device having NAND gate logic, in accordance with at least one embodiment of the present disclosure.

FIG. 4A is a diagram showing a disclosed photonic crystals logic device (i.e. an optical logic device) 400 having NAND gate logic, in accordance with at least one embodiment of the present disclosure. In this figure, the optical logic device 400 is shown to comprise a source 420, two photonic crystals 430A, 430B, a detector 440, and an inverter 470.

During operation of the optical logic device 400, the source 420 radiates at least one signal 450 towards the photonic crystals 430A, 430B. If the photonic crystals 430A, 430B sense a threshold strength of a physical phenomena (e.g., pressure, temperature, voltage, or vibration) associated with each of the photonic crystals 430A, 430B, the photonic crystals 430A, 430B are activated and, as such, will reflect the signal 450. However, if the photonic crystals 430A, 430B do not sense a threshold strength of the physical phenomena associated with each of the photonic crystals 430A, 430B, the photonic crystals 430A, 430B are not activated and, as such, will not reflect the signal 450.

As shown in FIG. 4A, both photonic crystals 430A, 430B sense a threshold strength for their corresponding physical phenomena and are activated to reflect the signal 450. The signal 450 is then shown to be reflected towards the detector 440. The detector 440 then detects the signal 450 and outputs a response 460 indicating that the signal 450 was detected. The inverter 470 receives the response 460 and generates an inverted response 475.

It should be noted that if one or both of the photonic crystals 430A, 430B do not sense a threshold strength for their corresponding physical phenomena, they will not be activated and will not reflect the signal 450. In these cases, the detector 440 will not detect the signal 450. The detector 440 will output a response 460 indicating that the signal 450 was not detected. The inverter 470 then receives the response 460 and generates an inverted response 475.

Figure 4B:
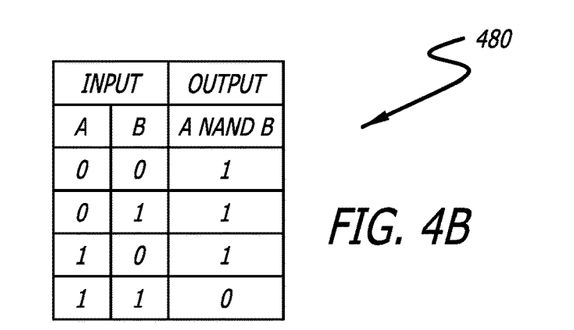
FIG. 4B is a table comprising NAND gate logic, which corresponds to the logic of the photonic crystals logic device of FIG. 4A.

FIG. 4B is a table 480 comprising NAND gate logic, which corresponds to the logic of the photonic crystals logic device of FIG. 4A. In table 480, the input columns contain a "1" when the corresponding photonic crystals 430A, 430B are activated and reflect the signal 450. And, the input columns contain a "0" when the corresponding photonic crystals 430A, 430B are not activated and do not reflect the signal 450. The output column values indicate the data contained in the response signal 475. In this case, the output column contains a "1" when the detector 440 does not detect the signal 450, and the output column contains a "0" when the detector 440 detects the signal 450.

Figure 4C:
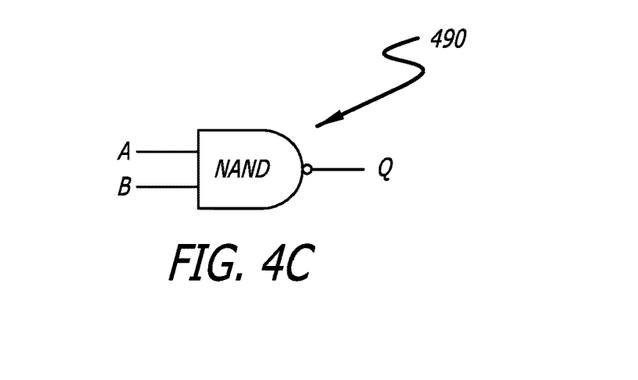
FIG. 4C is a conventional diagram of an NAND gate.

FIG. 4C is a conventional diagram of an NAND gate 490. In this figure, the NAND gate 490 is shown to have a two inputs (A and B), and one output (Q).

Figure 5A:
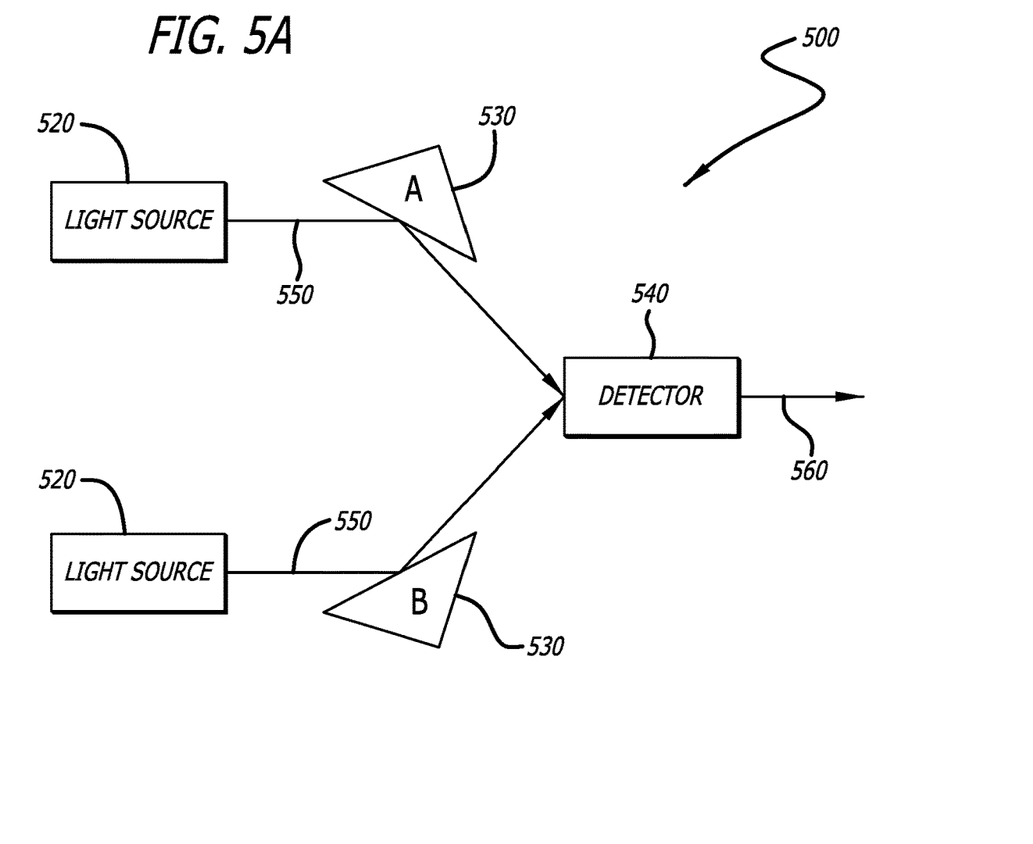
FIG. 5A is a diagram illustrating a disclosed photonic crystals logic device having OR gate logic, in accordance with at least one embodiment of the present disclosure.

FIG. 5A is a diagram illustrating a disclosed photonic crystals logic device (i.e. an optical logic device) 500 having OR gate logic, in accordance with at least one embodiment of the present disclosure. In this figure, the optical logic device 500 is shown to comprise two sources 520, two photonic crystals 530A, 530B, and a detector 540.

During operation of the optical logic device 500, each of the two sources 520 radiate at least one signal 550 towards the photonic crystals 530A, 530B, respectively. If the photonic crystals 530A, 530B sense a threshold strength of a physical phenomena (e.g., pressure, temperature, voltage, or vibration) associated with each of the photonic crystals 530A, 530B, the photonic crystals 530A, 530B are activated and, as such, will reflect the signal 550. However, if the photonic crystals 530A, 530B do not sense a threshold strength of the physical phenomena associated with each of the photonic crystals 530A, 530B, the photonic crystals 530A, 530B are not activated and, as such, will not reflect the signal 550.

As shown in FIG. 5A, both photonic crystals 530A, 530B sense a threshold strength for their corresponding physical phenomena and are activated to reflect the signal 550. The signal 550 is then shown to be reflected towards the detector 540. The detector 540 then detects the signal 550 and outputs a response 560 indicating that the signal 550 was detected.

It should be noted that if both of the photonic crystals 530A, 530B do not sense a threshold strength for their corresponding physical phenomena, they will not be activated and will not reflect the signal 550. In these cases, the detector 540 will not detect the signal 550. The detector 540 will output a response 560 indicating that a signal 550 was not detected.

Figures 5B, 5C:
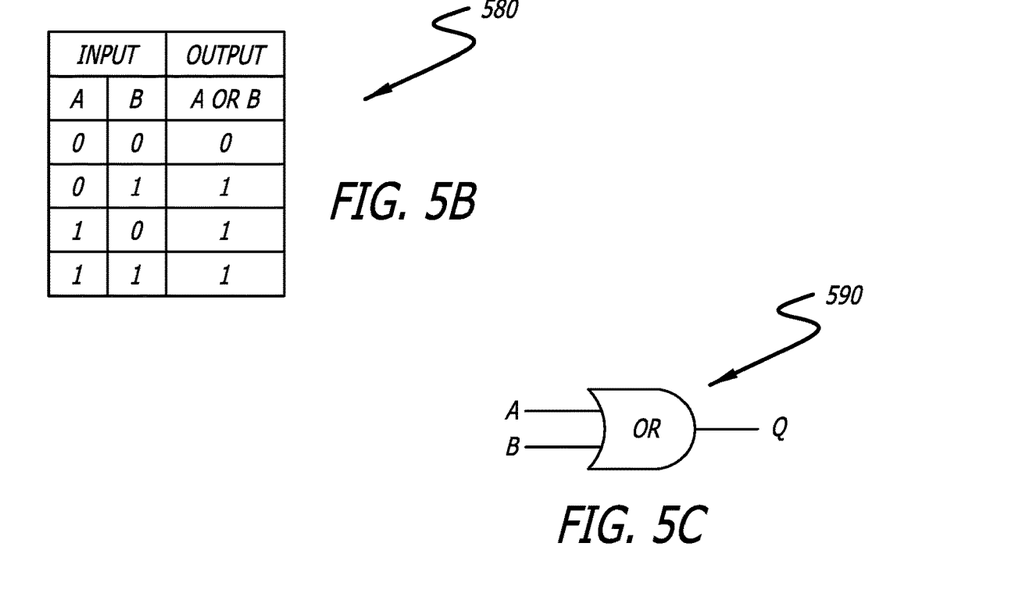
FIG. 5B is a table comprising OR gate logic, which corresponds to the logic of the photonic crystals logic device of FIG. 5A.
FIG. 5C is a conventional diagram of an OR gate.

FIG. 5B is a table 580 comprising OR gate logic, which corresponds to the logic of the photonic crystals logic device of FIG. 5A. In table 580, the input columns contain a "1" when the corresponding photonic crystals 530A, 530B are activated and reflect the signal 550. And, the input columns contain a "0" when the corresponding photonic crystals 530A, 530B are not activated and do not reflect the signal 550. The output column values indicate the data contained in the response signal 560. In this case, the output column contains a "1" when the detector 540 detects the signal 550, and the output column contains a "0" when the detector 540 does not detect the signal 550.

FIG. 5C is a conventional diagram of an OR gate 590. In this figure, the OR gate 590 is shown to have a two inputs (A and B), and one output (Q).

Figure 6A:
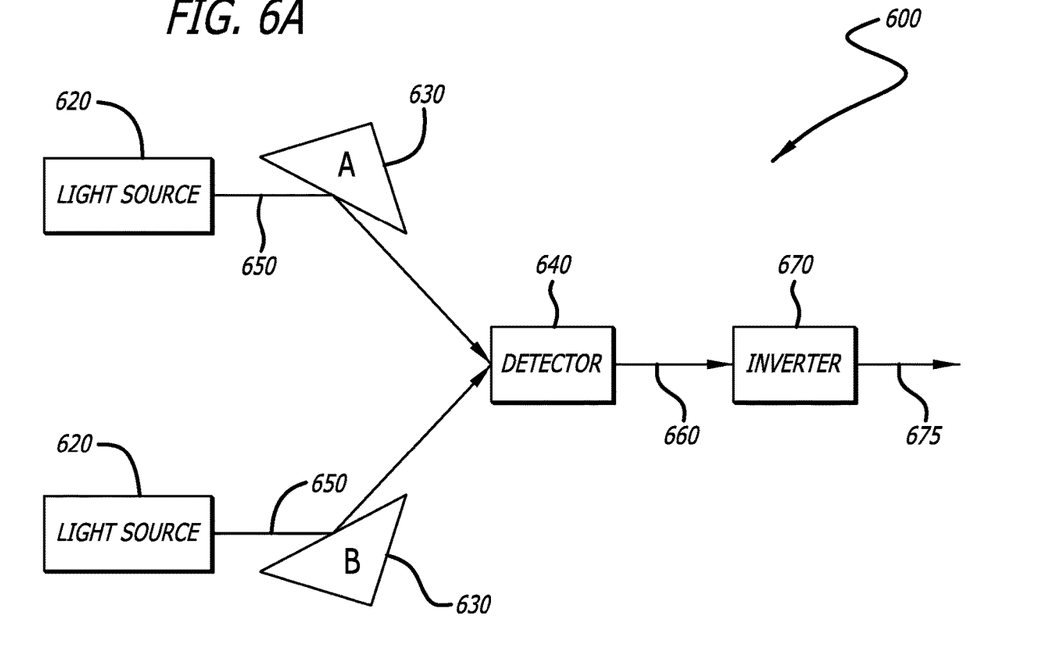
FIG. 6A is a diagram showing a disclosed photonic crystals logic device having NOR gate logic, in accordance with at least one embodiment of the present disclosure.

FIG. 6A is a diagram showing a disclosed photonic crystals logic device (i.e. an optical logic device) 600 having NOR gate logic, in accordance with at least one embodiment of the present disclosure. In this figure, the optical logic device 600 is shown to comprise two sources 620, two photonic crystals 630A, 630B, a detector 540, and an inverter 670.

During operation of the optical logic device 600, each of the two sources 620 radiate at least one signal 650 towards the photonic crystals 630A, 630B, respectively. If the photonic crystals 630A, 630B sense a threshold strength of a physical phenomena (e.g., pressure, temperature, voltage, or vibration) associated with each of the photonic crystals 630A, 630B, the photonic crystals 630A, 630B are activated and, as such, will reflect the signal 650. However, if the photonic crystals 630A, 630B do not sense a threshold strength of the physical phenomena associated with each of the photonic crystals 630A, 630B, the photonic crystals 630A, 630B are not activated and, as such, will not reflect the signal 650.

As shown in FIG. 6A, both photonic crystals 630A, 630B sense a threshold strength for their corresponding physical phenomena and are activated to reflect the signal 650. The signal 650 is then shown to be reflected towards the detector 640. The detector 640 then detects the signal 650 and outputs a response 660 indicating that the signal 650 was detected. The inverter 670 receives the response 660 and generates an inverted response 675.

It should be noted that if both of the photonic crystals 630A, 630B do not sense a threshold strength for their corresponding physical phenomena, they will not be activated and will not reflect the signal 650. In these cases, the detector 640 will not detect the signal 650. The detector 640 will output a response 660 indicating that a signal 650 was not detected. The inverter 670 then receives the response 660 and generates an inverted response 675.

Figures 6B, 6C:
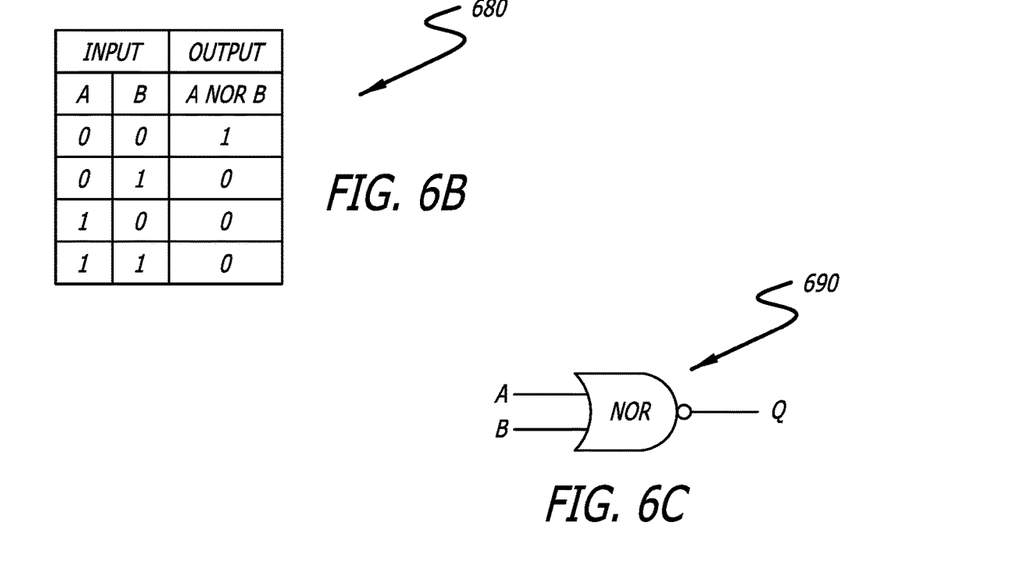
FIG. 6B is a table comprising NOR gate logic, which corresponds to the logic of the photonic crystals logic device of FIG. 6A.
FIG. 6C is a conventional diagram of an NOR gate.

FIG. 6B is a table 680 comprising NOR gate logic, which corresponds to the logic of the photonic crystals logic device of FIG. 6A. In table 680, the input columns contain a "1" when the corresponding photonic crystals 630A, 630B are activated and reflect the signal 650. And, the input columns contain a "0" when the corresponding photonic crystals 630A, 630B are not activated and do not reflect the signal 650. The output column values indicate the data contained in the response signal 675. In this case, the output column contains a "1" when the detector 640 does not detect the signal 650, and the output column contains a "0" when the detector 640 detects the signal 650.

FIG. 6C is a conventional diagram of an NOR gate 690. In this figure, the NOR gate 690 is shown to have a two inputs (A and B), and one output (Q).

Figure 7:
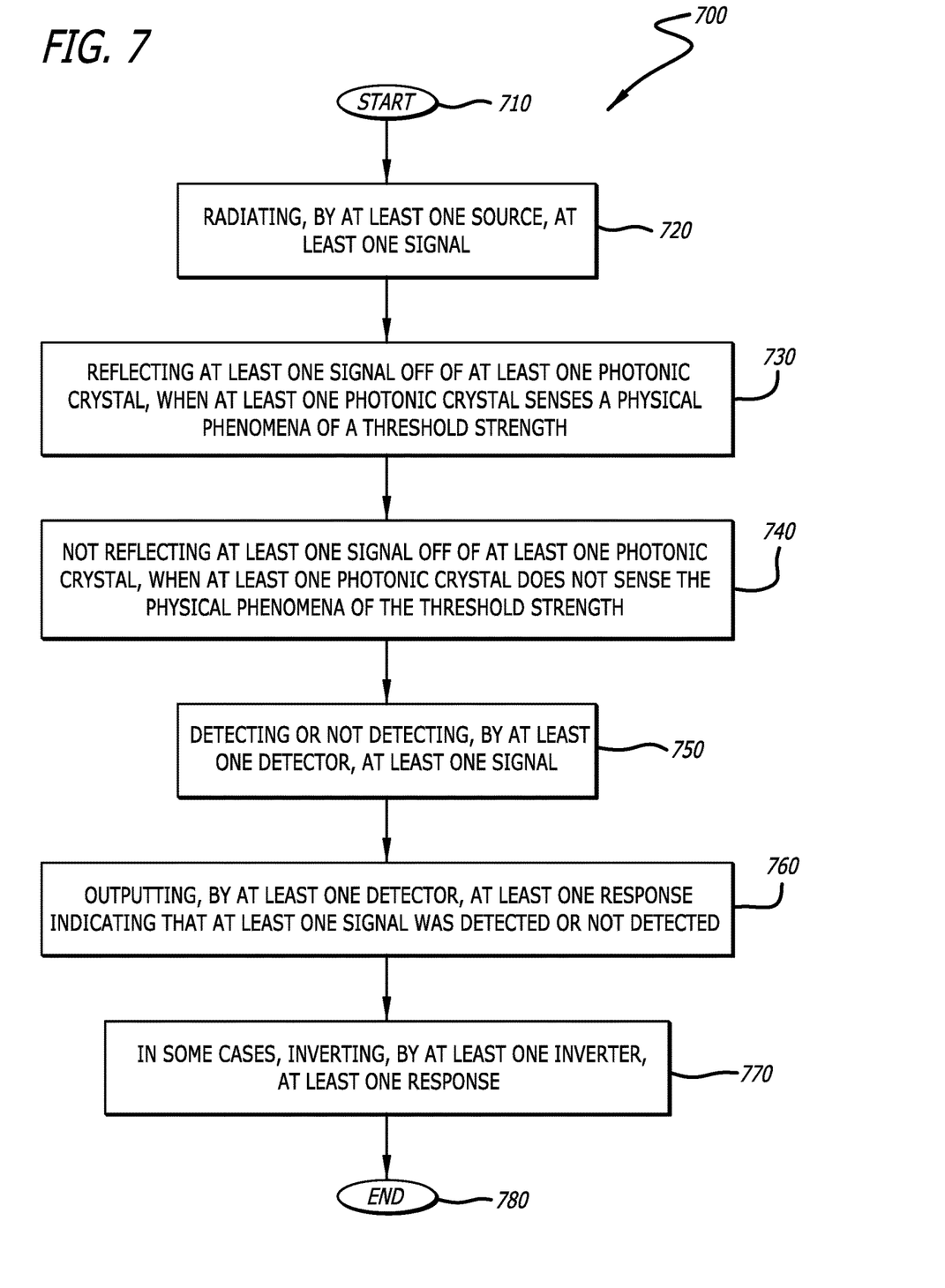
FIG. 7 is a diagram showing a flow chart for the disclosed method for a photonic crystals logic device (i.e. an optical logic device), in accordance with at least one embodiment of the present disclosure.

FIG. 7 is a diagram showing a flow chart for the disclosed method 700 for a photonic crystals logic device (i.e. an optical logic device), in accordance with at least one embodiment of the present disclosure. At the start 710 of the method, at least one source radiates at least one signal 720. Then, at least one signal is reflected off of at least one photonic crystal, when at least one photonic crystal senses a physical phenomena of a threshold strength 730. At least one signal is not reflected off of at least one photonic crystal, when at least one photonic crystal does not sense a physical phenomena of a threshold strength 740. At least one detector then detects or does not detect at least one signal 750. Then, at least one detector outputs at least one response indicating that at least one signal was detected or not detected 760. In some cases, at least one inverter inverts at least one response 770. Then, the method 700 ends 780.

Figure 8A:
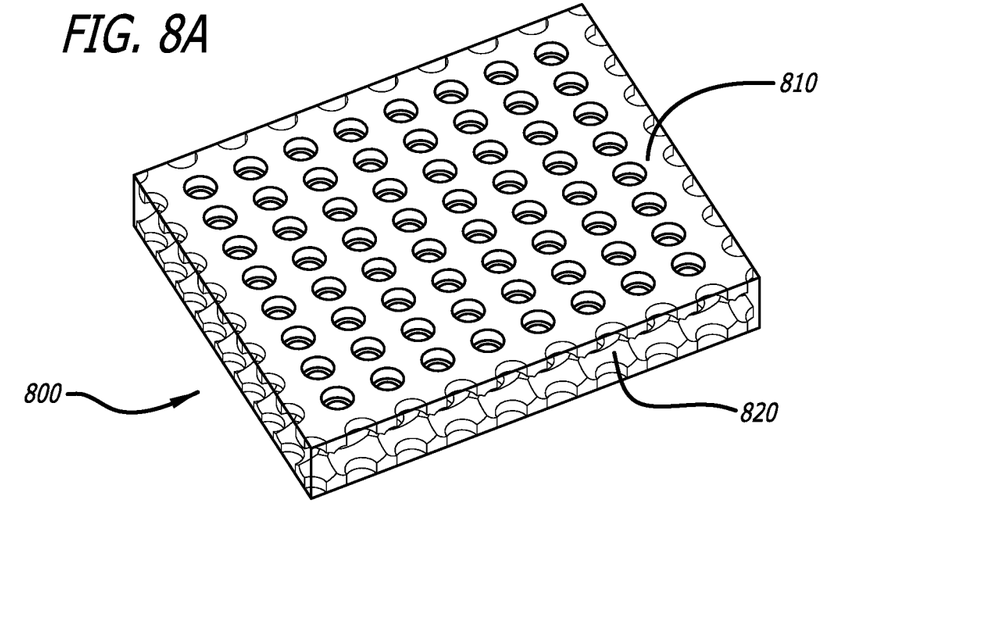
FIG. 8A is a diagram illustrating a photonic crystal reflector component, which may be employed by the disclosed photonic crystals logic device (i.e. an optical logic device), in accordance with at least one embodiment of the present disclosure.

FIG. 8A is a diagram illustrating a photonic crystal reflector component 800, which may be employed by the disclosed photonic crystals logic device (i.e. an optical logic device), in accordance with at least one embodiment of the present disclosure.

The system of the present disclosure may implement at least one disclosed optical logic device (which may each employ at least one photonic crystal reflector component 800) into a single chip design. For this implementation, the components (i.e. source(s), photonic crystal(s), detector(s), and optional inverter(s)) of each of the optical logic devices are all housed within a single integrated circuit (IC) chip, such as a field programmable crystal array.

Complex logic can be achieved by employing a plurality of optical logic devices (which may each employ at least one photonic crystal reflector component 800) connected together within the chip. In one or more embodiments, the logic may be altered by disabling (e.g., by blowing a fuse and/or by removal of at least one thermal and/or electrical contact by use of, for example, a micro-electro-mechanical systems (MEMS) switch), either permanently or not permanently, at least one of the photonic crystals of at least one of the optical logic devices housed within the chip, thereby creating a field programmable crystal array.

In this figure, the photonic crystal reflector component 800 is shown to include two internal plates 810, 820. Each of the plates 810, 820 work in conjunction as a single optical element utilized as part of a photonic crystals logic device.

Figure 8B:
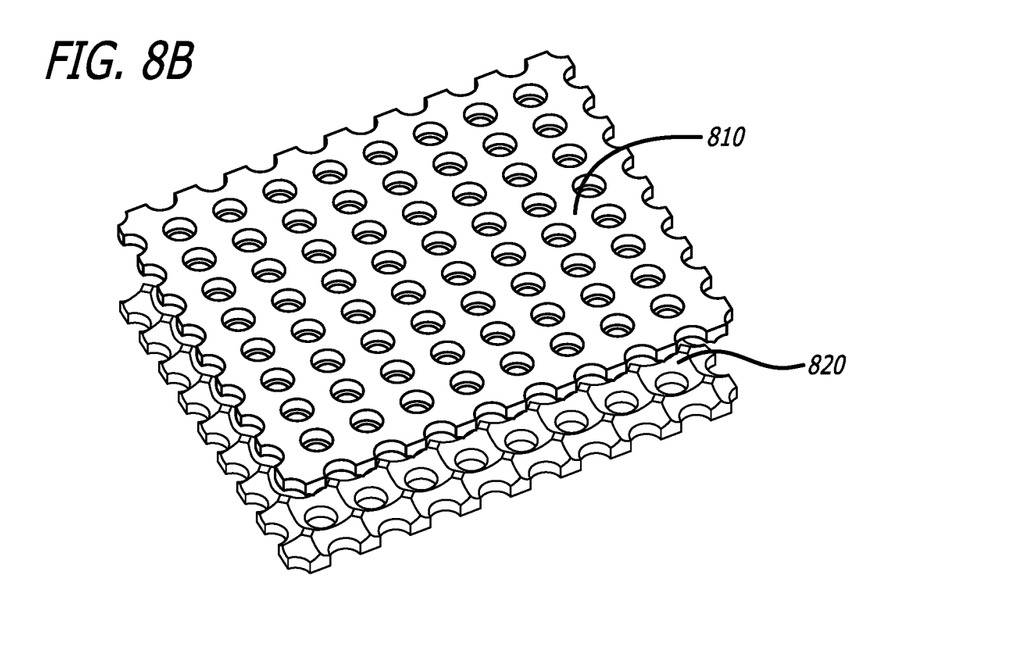
FIG. 8B is a diagram depicting the internal structure of the photonic crystal reflector component of FIG. 8A, in accordance with at least one embodiment of the present disclosure.

FIG. 8B is a diagram depicting the internal structure of the photonic crystal reflector component 800 of FIG. 8A, in accordance with at least one embodiment of the present disclosure. In this figure, details of the two plates 810, 820 are shown.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Although particular embodiments have been shown and described, it should be understood that the above discussion is not intended to limit the scope of these embodiments. While embodiments and variations of the many aspects of the present disclosure have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for an optical logic device, the method comprising:
   radiating, by at least one source via free space, at least one signal;
   reflecting the at least one signal off of at least one photonic crystal via free space, when the at least one photonic crystal senses a physical phenomena of a threshold strength;
   not reflecting the at least one signal off of the at least one photonic crystal, when the at least one photonic crystal does not sense the physical phenomena of the threshold strength;
   detecting or not detecting, by at least one detector via free space, the at least one signal; and
   outputting, by the at least one detector, at least one response indicating that the at least one signal was one of detected or not detected,
   wherein reflections and non-reflections of the at least one signal off of the at least one photonic crystal are inputs for the optical logic device, and the at least one response from the at least one detector is at least one output of the optical logic device, and
   wherein a configuration of the at least one source, the at least one photonic crystal, and the at least one detector corresponds to logic of the optical logic device.

2. The method of claim 1, wherein the method further comprises: inverting, by at least one inverter, the at least one response.

3. The method of claim 1, wherein the at least one detector is at least one of a light detector or a laser detector.

4. The method of claim 1, wherein the at least one signal is an electromagnetic signal.

5. The method of claim 1, wherein the at least one source is at least one of a light source or a laser source.

6. The method of claim 1, wherein the at least one photonic crystal is at least one of one dimensional, two dimensional, or three dimensional.

7. The method of claim 1, wherein the physical phenomena is one of pressure, temperature, voltage, or vibration.

8. The method of claim 1, wherein the method further comprises: disabling, at least one of the at least one photonic crystal.

9. The method of claim 1, wherein the at least one source, the at least one photonic crystal, and the at least one detector are housed within at least one integrated circuit (IC) chip.

10. The method of claim 1, wherein the optical logic device has one of AND gate logic, NAND gate logic, OR gate logic, or NOR gate logic.

11. The method of claim 1, wherein the physical phenomena is one of voltage or vibration.

12. An optical logic device, the device comprising:
   at least one source to radiate via free space at least one signal,
   wherein the at least one signal is reflected off of at least one photonic crystal via free space, when the at least one photonic crystal senses a physical phenomena of a threshold strength,
   wherein the at least one signal is not reflected off of the at least one photonic crystal, when the at least one photonic crystal does not sense the physical phenomena of the threshold strength; and
   at least one detector to detect or to not detect the at least one signal via free space, and to output at least one response indicating that the at least one signal was one of detected or not detected,
   wherein reflections and non-reflections of the at least one signal off of the at least one photonic crystal are inputs for the optical logic device, and the at least one response from the at least one detector is at least one output of the optical logic device, and wherein a configuration of the at least one source, the at least one photonic crystal, and the at least one detector corresponds to logic of the optical logic device.

13. The device of claim 12, wherein the device further comprises: at least one inverter to invert the at least one response.

14. The device of claim 12, wherein the at least one detector is at least one of a light detector or a laser detector.

15. The device of claim 12, wherein the at least one signal is an electromagnetic signal.

16. The device of claim 12, wherein the at least one source is at least one of a light source or a laser source.

17. The device of claim 12, wherein the at least one photonic crystal is at least one of one dimensional, two dimensional, or three dimensional.

18. The device of claim 12, wherein the physical phenomena is one of pressure, temperature, voltage, or vibration.

19. The device of claim 12, wherein at least one of the at least one photonic crystal is disabled.

20. The device of claim 12, wherein the at least one source, the at least one photonic crystal, and the at least one detector are housed within at least one integrated circuit (IC) chip.

\* \* \* \* \*